United States Patent
Masuda et al.

(10) Patent No.: US 8,111,664 B2
(45) Date of Patent: Feb. 7, 2012

(54) COMMUNICATION PATH SWITCHING SYSTEM AND METHOD

(75) Inventors: Masafumi Masuda, Yokosuka (JP);
Akihiro Maebara, Yokohama (JP);
Masayuki Koshino, Fujisawa (JP);
Yasuhiro Kato, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1114 days.

(21) Appl. No.: 11/576,472

(22) PCT Filed: Oct. 3, 2005

(86) PCT No.: PCT/JP2005/018302
§ 371 (c)(1),
(2), (4) Date: Nov. 19, 2007

(87) PCT Pub. No.: WO2006/038592
PCT Pub. Date: Apr. 13, 2006

(65) Prior Publication Data
US 2009/0141674 A1    Jun. 4, 2009

(30) Foreign Application Priority Data
Oct. 1, 2004 (JP) ................................. 2004-290311

(51) Int. Cl.
*H04W 4/00* (2009.01)
(52) U.S. Cl. ......... 370/331; 370/328; 370/329; 370/401
(58) Field of Classification Search ........................ None
See application file for complete search history.

(56) References Cited

U.S. PATENT DOCUMENTS

| | | | | |
|---|---|---|---|---|
| 5,577,029 A | * | 11/1996 | Lu et al. ........................ | 455/445 |
| 7,650,143 B2 | * | 1/2010 | Jagadeesan et al. ........... | 455/417 |
| 7,702,364 B2 | * | 4/2010 | Ray et al. ...................... | 455/561 |
| 2007/0298808 A1 | * | 12/2007 | Pan et al. .................... | 455/452.1 |
| 2011/0044289 A1 | * | 2/2011 | Kezys ........................... | 370/331 |

FOREIGN PATENT DOCUMENTS

| | | |
|---|---|---|
| JP | 6 205459 | 7/1994 |
| JP | 7 297781 | 11/1995 |
| JP | 2003 169368 | 6/2003 |

OTHER PUBLICATIONS

3GPP TS 21. 101,"3$^{rd}$ Generation Partnership Project; Technical Specification Group Services and System Aspects; Technical Specifications and Technical Report for a UTRAN-Based 3Gpp System (Release 5)", Technical Specification, V5. 11.0, pp. 1-22, 2006.
3GPP TR 25.933,"3$^{rd}$ Generation Partnership Project; Technical Specification Group Radio Access Network; IP Transport in UTRAN (Release 5)", Technical Report, V5.4.0, pp. 1-138, 2003.

* cited by examiner

*Primary Examiner* — Donald Mills
(74) *Attorney, Agent, or Firm* — Oblon, Spivak, McClelland, Maier & Neustadt, L.L.P.

(57) ABSTRACT

A communication path switching system including a wireless base station having a function of wireless communication with a mobile station and a function of relaying data transmitted from the mobile station over a wireless communication path; and plural transmission apparatuses having a function of wired communication with the wireless base station and capable of establishing respectively a wired communication path to be used to relay the data transmitted from a mobile station toward another mobile station. One wired communication path from the wireless base station to one transmission apparatus is switched to another wired communication path from the wireless base station to another transmission apparatus without re-establishing a wireless communication path between the mobile station and the wireless base station.

3 Claims, 9 Drawing Sheets

COMMUNICATION PATH SWITCHING SYSTEM AND METHOD

FIELD OF THE INVENTION

The present invention relates to a system and method of switching wired communication paths in a mobile communication system, and more particularly to a system and method of switching wired communication paths without re-establishing a wireless communication path between a mobile station and a wireless base station.

BACKGROUND ART

In recent years, there has been proposed by 3GPP (3rd Generation Partnership Projects) and specified in non-patent document 1 a mobile wireless communication system called a W-CDMA (Wideband-Code Division Multiple Access) system or a UMTS system (Universal Mobile Telecommunications System), which is based on Code Division Multiple Access (CDMA).

Figure 1:
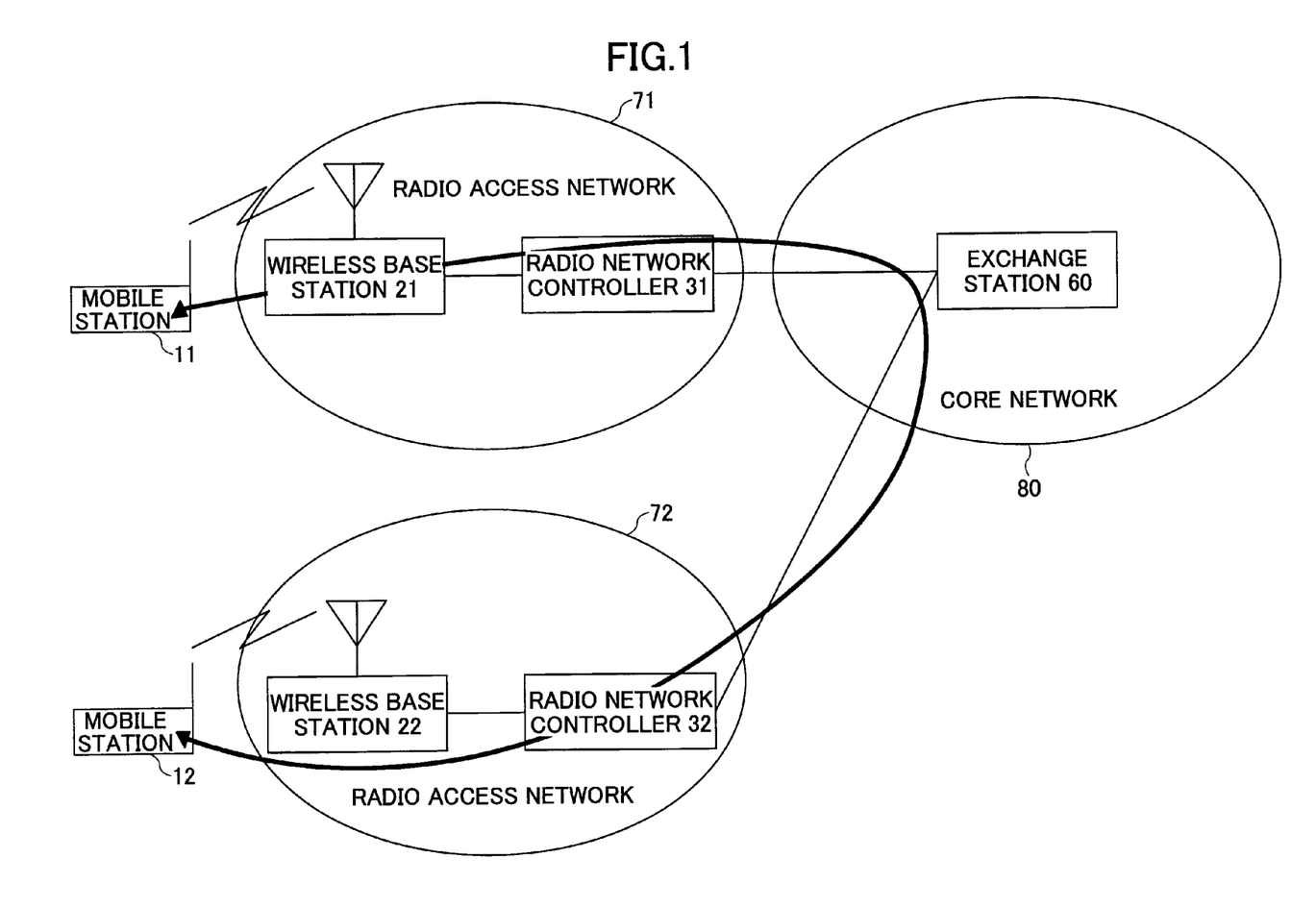
FIG. 1 is a schematic view of a typical configuration of a W-CDMA system.

FIG. 1 illustrates an example of a typical configuration of a W-CDMA system. This system is composed of mobile stations (User Equipment: UE) 11, 12 having a wireless communication function, wireless base stations (Node B) 21, 22 having a function of wireless communication with the mobile stations, radio network controllers (RNC) 31, 32 that are connected to corresponding wireless base stations and perform a wireless control operation, and an exchange station 60 that is connected to the radio network controllers and performs an exchange operation. This configuration enables communications between the mobile station 11 and the mobile station 12.

Here, a network including the wireless base stations 21, 22 and the radio network controllers 31, 32 is called a radio access network (RAN) and a network including the exchange station is called a core network (CN). Although a core network 80 can generally include a plurality of layered exchange stations and also other apparatuses such as a home memory storing subscriber information, FIG. 1 shows only one exchange station 60 and omits other apparatuses in order to simplify the explanation.

In the system shown in FIG. 1, user data can be transmitted from the mobile station 11 to the mobile station 12. In this case, the user data travel through a transfer path of the mobile station 11, the wireless base station 21, the radio network controller 31, the exchange station 60, the radio network controller 32, the wireless base station 22, and the mobile station 12 in this order. For descriptive purposes, communication through such a path is referred to as an external communication hereinafter.

Figure 2:
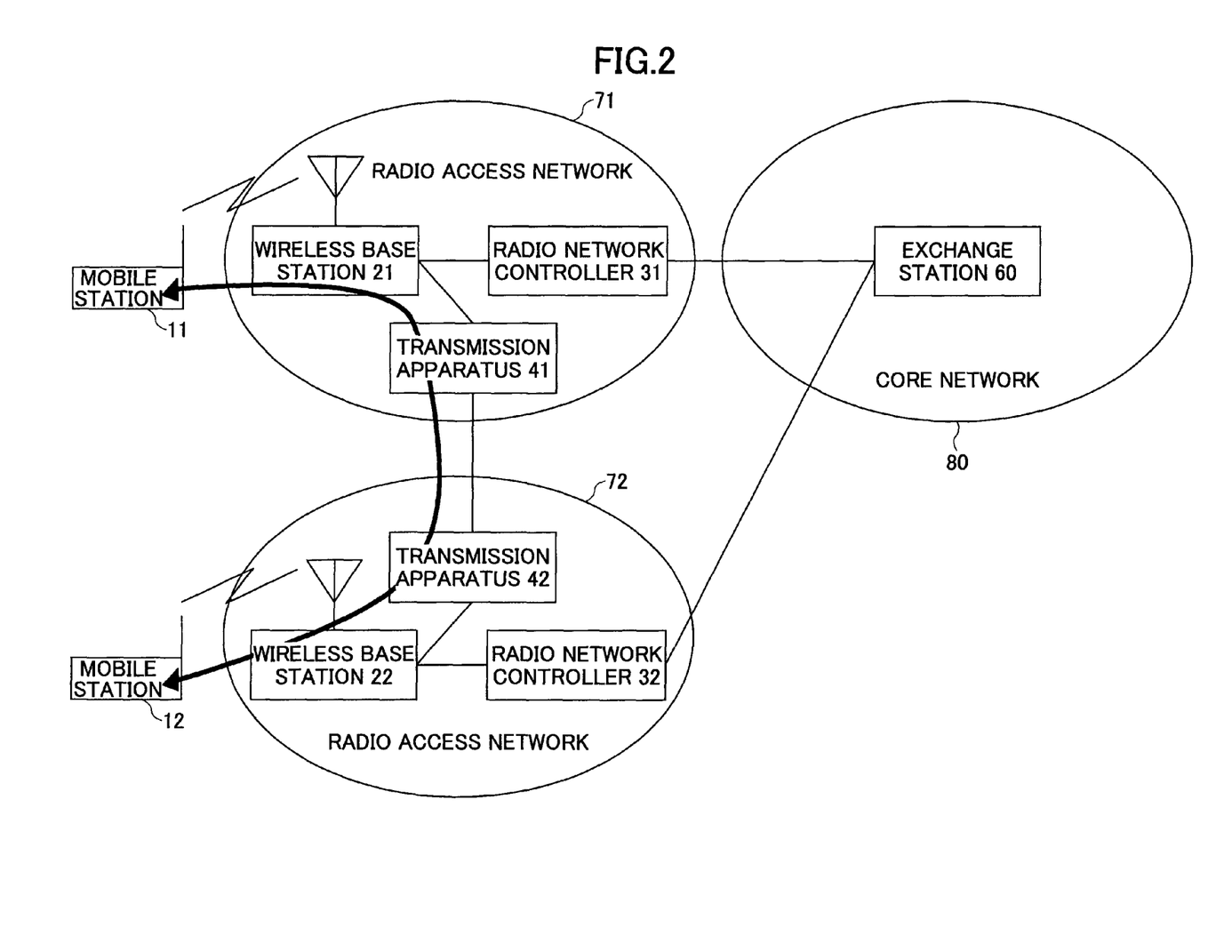
FIG. 2 is a schematic view for explaining a communication path of an internal communication in a W-CDMA system.

FIG. 2 illustrates a shortcut communication path that routes through not the exchange station but a transmission apparatus. Radio access networks 71, 72 shown in FIG. 2 are provided with transmission apparatuses 41, 42, respectively. The user data travel through a transfer path of the mobile station 11, the wireless base station 21, the transmission apparatus 41, the transmission apparatus 42, the wireless base station 22, and the mobile station 12 in this order. For descriptive purposes, communication through such a transfer path is referred to as an internal communication. Such a transmission path serves as a transmission function that reduces workload on various lines and a core network apparatus such as the exchange station 60, and is more frequently adopted in an Internet-Protocol (IP)-based radio access network, reported in non-patent document 2 below. This is because the IP is a connectionless protocol and allows for data transfer based only on a calling and a receiving address without attention to a path therebetween for the internal communication.

Figure 3:
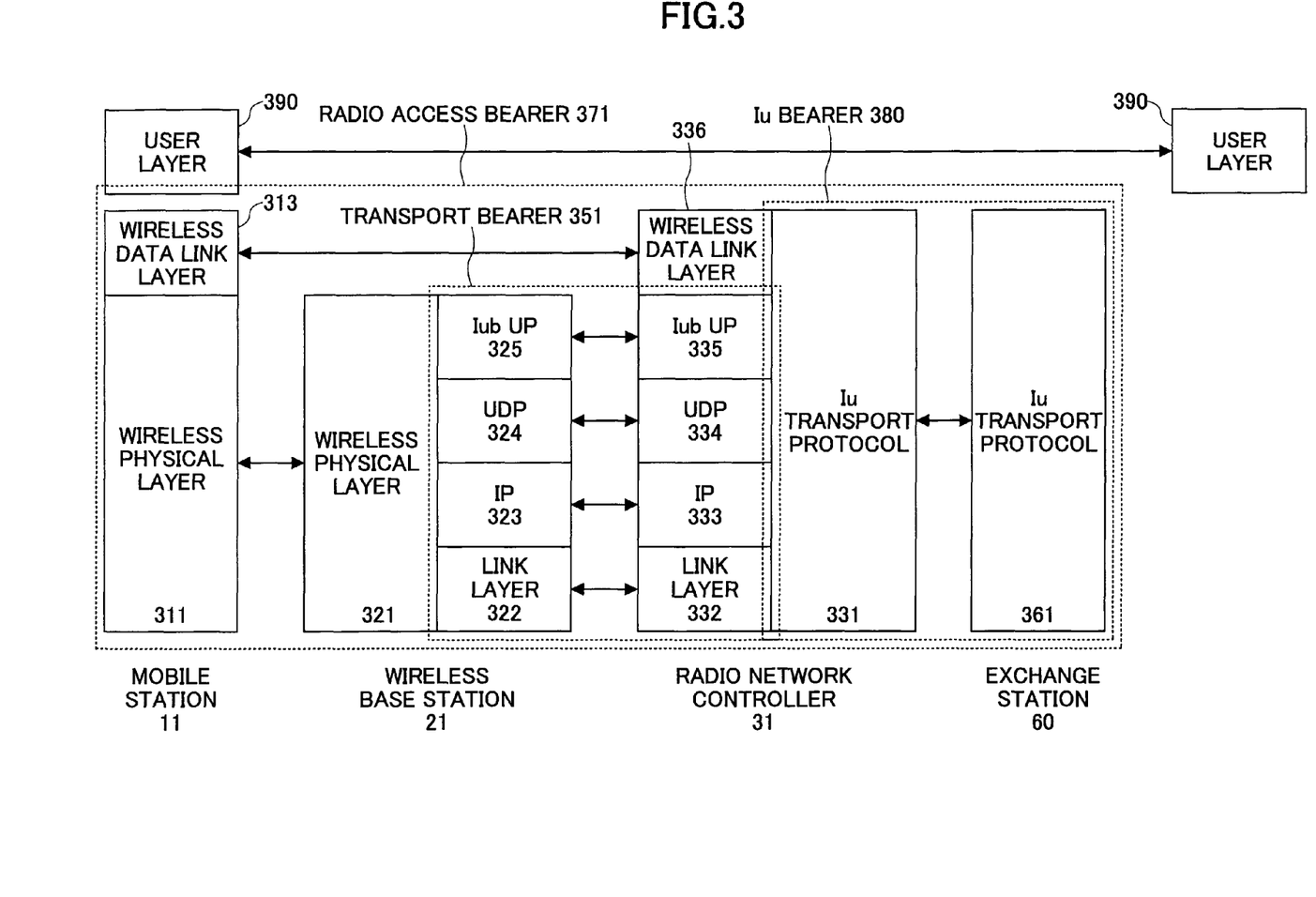
FIG. 3 is a block diagram for explaining an example of a protocol stack in a W-CDMA system.

FIG. 3 shows an example of a protocol stack in the W-CDMA system. In this figure, wireless physical layers 311, 321 terminate respectively in the mobile station 11 and the wireless base station 21, having a function of wireless communication. Wireless data link layers 313, 336 terminate respectively in the mobile station 11 and the radio network controller 31, having a function of data link control over a wireless communication path, such as re-transmission control, data confidentiality, integrity protection or the like.

Here, data transmitted and received between the wireless data link layer 336 and the wireless physical layer 321 are transported in the radio access network by a protocol called Iub UP defined over the transport path of a transport protocol such as UDP/IP protocol. This transport path is called a "transport bearer" 351. In addition, data transmitted and received between the radio network controller 31 and the core network are transported through a transport path called an "Iu bearer" 380 configured by an Iu transport protocol. Here, since the Iu transport protocol is not directly related to the present invention, detailed explanation thereof is omitted. A user layer 390 is defined as an upper layer over the wireless data link layers 313, 336 and the Iu transport protocols 331, 361. The user data are transparently transferred through a radio access system by a "radio access bearer" 371 configured between the mobile station 11 and an intended party by a group of the protocols as explained above.

Figure 4:
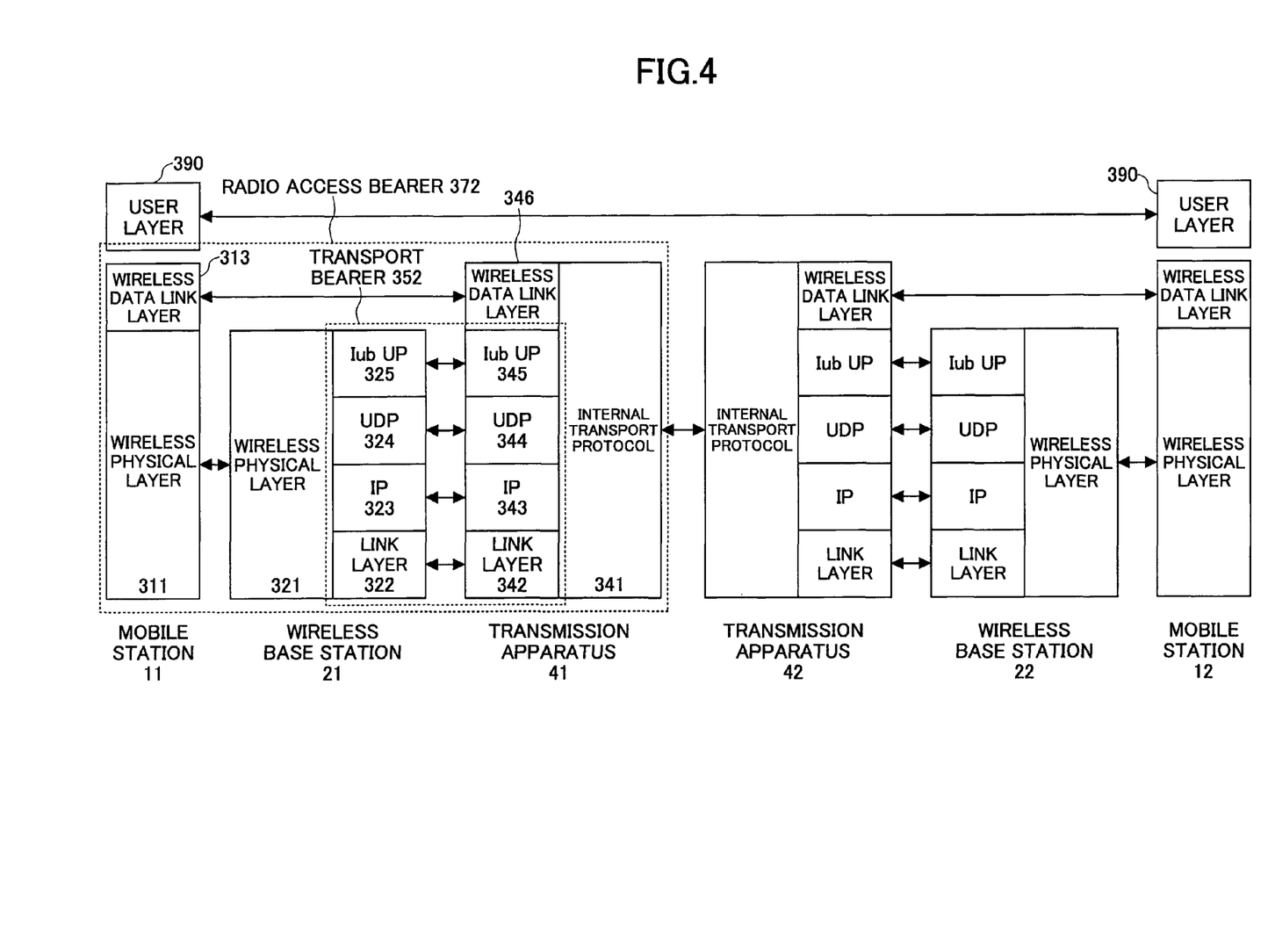
FIG. 4 is a block diagram for explaining an example of a protocol stack for an internal communication in a W-CDMA system.

FIG. 4 illustrates an example of a protocol stack in the internal communication in the W-CDMA system. In the internal communication, a wireless data link layer 346 and a transport bearer 352 are terminated by not the radio network controller but the transmission apparatus 41. Data transmission/reception is carried out between the transmission apparatus 41 and the transmission apparatus 42. Except for this, the same explanation given with reference to FIG. 3 is applied.

The system shown in FIG. 4 supports both the external and the internal communication and includes a function of selecting either the external communication or the internal communication at every event of communication, and a function of switching between the external communication and the internal communication during communications. The latter function is to allow for switching to the internal communication after a caller is off-hook, by transmitting a ring-back tone through the external communication at the time of calling, or to allow for an answer to a call taking place over the external (internal) communication during communications over the internal (external) communication.

Next, there will be outlined a conventional method that has since been contemplated for switching to-and-fro between the external communication and the internal communication. In the communications based on the protocol stack shown in FIGS. 3 and 4, the conventional method for switching from the external communication to the internal communication requires re-establishment of a radio access bearer. Namely, while a new radio access bearer 372 is established, the radio access bearer 371 used for the external communication is released. This means that there has to be carried out resetting of the wireless physical layers 311, 321 and the wireless data link layers 313, 336; re-establishment of the transport bearer 351; and elimination of the Iu bearer 380.

Figure 5:
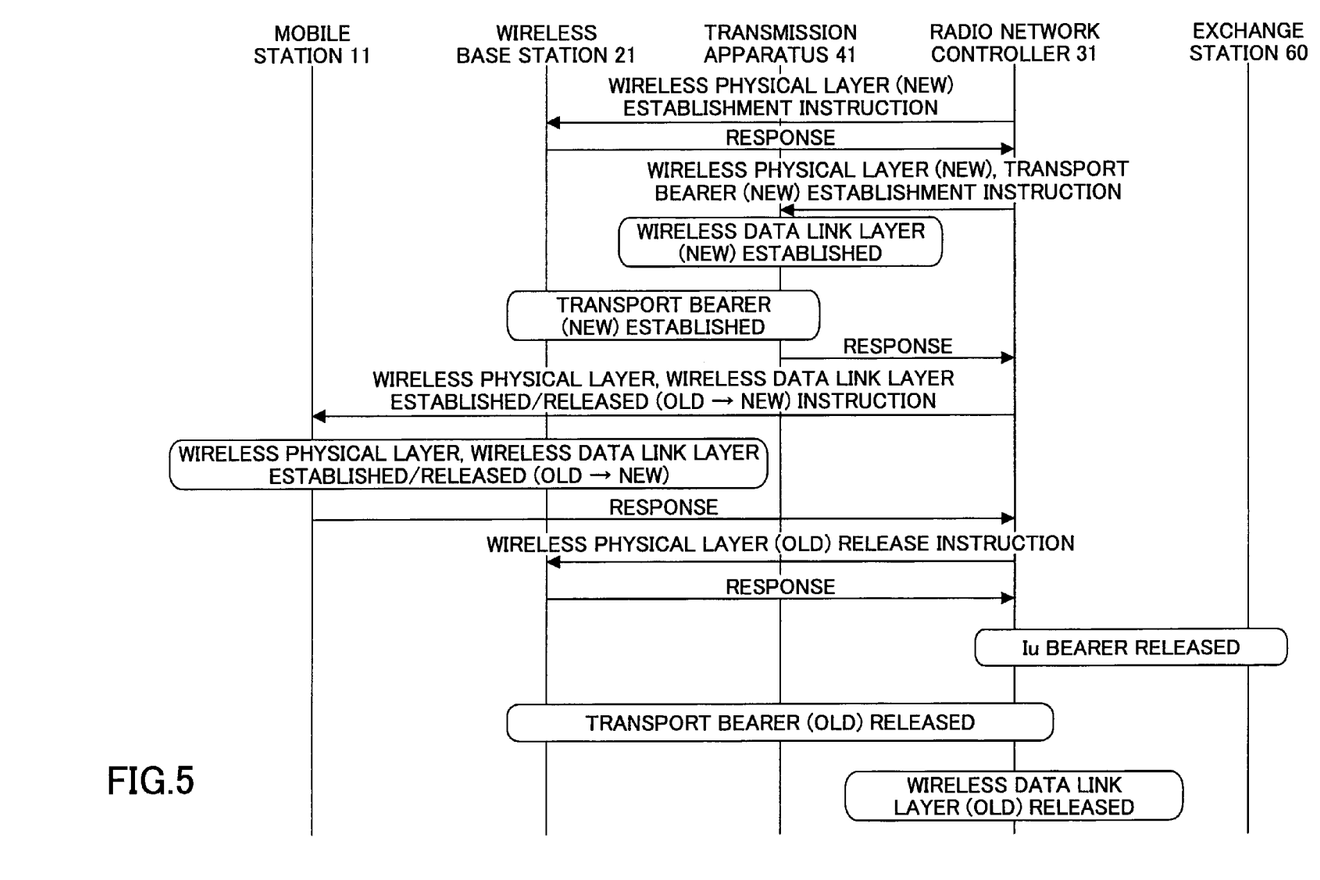
FIG. 5 is an example of a sequence illustrating a widely used switching procedure from an external communication to an internal communication.

FIG. 5 is an example of a sequence contemplated in the past that shows procedures of switching from the external communication to the internal communication. When detecting a trigger for switching to the internal communication during the external communication, the radio network controller 31 instructs the wireless base station 21 to establish a new wireless physical layer for the internal communication. Upon being instructed, the wireless base station 21 establishes a wireless physical layer based on the instruction and then starts to transmit radiowaves. Subsequently, the radio network controller 31 instructs the transmission apparatus 41 to establish a new wireless data link layer and a transport bearer for the internal communication. Upon completion of the instruction, the radio network controller 31 instructs the mobile station 11 to re-establish a wireless physical layer and a wireless data link layer. At this time, the mobile station 11 is notified of establishment information on the wireless physical layer and the wireless data link layer that have been established in the wireless base station 21 and the transmission apparatus 41, respectively.

Upon being notified, the mobile station 11 performs re-establishment of a wireless physical layer and wireless data link layer from the old wireless physical layer and wireless data link layer for the external communication to a new wireless physical layer and wireless data link layer for the internal communication. Namely, the mobile station 11 performs a transition to a new radio access bearer. Here, re-establishment of a wireless physical layer means re-establishment of a wireless physical connection identified by a diffusion code in the W-CDMA system. In addition, re-establishment of a wireless data link layer means initialization of an order control sequence number and a parameter relating to re-transmission. Next, the radio network controller 31 releases the wireless physical layer for the external communication, the Iu bearer 380 between the radio network controller and the exchange apparatus, the wireless data link layer 313 and the transport bearer 351, which have all become unnecessary now, thereby completing the sequence. By the way, switching from the external communication to the internal communication has been explained above; opposite switching from the internal communication to the external communication can be explained based on the same idea. Moreover, while switching between the radio network control 31 and the transmission apparatus 41 has been explained above, switching between the two transmission apparatuses can generally be realized in the same procedures.

Non-patent document 1: 3 GPP Technical Specifications TS21.101

Non-patent document 2: 3 GPP Technical Reports TR25.933

SUMMARY OF INVENTION

Problem to be Solved by the Invention

The aforementioned conventional way of switching between the external communication and the internal communication is accompanied by the re-establishment of the wireless physical layer and the wireless data link layer in the mobile station at the time of switching, which leads to a drawback of increased processing workload on the mobile station and deteriorated service due to a processing delay associated with the re-establishment. The present invention has been made in view of the above, and the objective thereof is to provide a system and method capable of shortening the processing delay and reducing the processing workload on the mobile station which are associated with switching between the external communication and the internal communication.

Means for Solving the Problem

A communication path switching system according to one aspect of the present invention in order to achieve the above objective is composed of a wireless base station having a function of wireless communication with a mobile station and a function of relaying data from the mobile station over a wireless communication path; and plural transmission apparatuses having a function of wired communication with the wireless base station and capable of establishing respectively a wired communication path to be used to relay the data transmitted from a mobile station toward another mobile station; where one wired communication path from the wireless base station to one transmission apparatus is switched to another wired communication path from the wireless base station to another transmission apparatus without re-establishing a wireless communication path between the mobile station and the wireless base station.

In the communication path switching system above, the transmission apparatus can include wireless data transmission and reception control means configured to perform wireless data transmission and reception control over the wireless communication path with the mobile station; and notifying means configured to extract wireless data transmission and reception information on the wireless communication path with the mobile station and notify another transmission apparatus of the extracted information.

Moreover, the transmission apparatus further can include means configured to start wireless data transmission and reception control based on wireless data transmission and reception control information sent from another transmission apparatus without resetting the wireless data transmission and reception control.

A method of switching communication paths according to another aspect of the present invention is performed in a system composed of a wireless base station having a function of wireless communication with a mobile station and a function of relaying data from the mobile station over a wireless communication path; and plural transmission apparatuses having a function of wired communication with the wireless base station, capable of establishing respectively a wired communication path to be used to relay the data transmitted from a mobile station toward another mobile station, and performing wireless data transmission and reception control over a wireless communication path therebetween with a mobile station. The method includes a step in which one transmission apparatus performing the wireless data transmission and reception control over a wireless communication path therebetween with a mobile station extracts wireless data transmission and reception control information thereof, and thus notifies another transmission apparatus of the extracted information; and a step in which the another transmission apparatus starts the wireless data transmission and reception control based on the received wireless data transmission and reception control information without resetting any wireless data transmission and reception control; where a communication path is switched from the one transmission apparatus to the another transmission apparatus without re-establishing the wireless communication path between the mobile station and the wireless base station.

A wireless base station, according to another aspect of the present invention, in a mobile communication system that includes plural transmission apparatuses and allows for switching of communication paths is comprised of means configured to perform wireless communication with a mobile station and relay data from the mobile station over a wireless communication path; means configured to perform wired communication with a transmission apparatus and relay data transmitted from the mobile station toward the transmission apparatus over a wired communication path; means configured to associate simultaneously the wireless communication path with plural wired communication paths; and means configured to make a transition from a state of data relay between the wireless communication path and one wired communication path to another state of data relay between the wireless communication path and another wired communication path without re-establishing the wireless communication path.

A transmission apparatus, according to another aspect of the present invention, in a mobile communication system that includes a wireless base station and allows for switching of communication paths is comprised of means configured to perform wired communication with a wireless base station and establish a wired communication path to be used to relay data transmitted from a mobile station toward another mobile station; means configured to perform wireless data transmission and reception control over a wireless communication path therebetween with the mobile station; and means configured to extract wireless data transmission and reception control information regarding the wireless communication path therebetween with the mobile station and thus notify another transmission apparatus of the extracted information.

A transmission apparatus, according to another aspect of the present invention, in a mobile communication system that includes a wireless base station and allows for switching of communication paths is composed of means configured to perform wired communication with a wireless base station and establish a wired communication path to be used to relay data transmitted from a mobile station toward another mobile station; means configured to perform wireless data transmission and reception control over a wireless communication path with the mobile station; and means configured to start the wireless data transmission and reception control based on establishment information sent from another transmission apparatus without resetting the wireless data transmission and reception control.

Advantage of the Invention

According to an embodiment of the present invention, switching between the external communication and the internal communication can be executed, without re-establishing a wireless data link layer in the mobile station and a wireless physical layer, by shifting a termination point of the wireless data link layer in the radio access network between the radio network controller and the transmission apparatus, and by switching transport bearers at the time of switching between the external communication and the internal communication. Therefore, a processing delay associated with the switching between the external communication and the internal communication can be shortened; and a processing workload in the mobile station can be reduced. Additionally, communication paths in the transmission apparatus can be readily changed.

LIST OF REFERENCE SYMBOLS

41: transmission apparatus
31: radio network controller
21: wireless base station
11: mobile station
218, 219: transport function
216: transport bearer switching control section
415: wireless data link information extraction and establishment section

BEST MODE FOR CARRYING OUT THE INVENTION

Referring to the accompanying drawings, a communication path switching system, a switching method, a wireless base station and a transmission apparatus according to preferred embodiments of the present invention will be described. It should be noted that the same and similar reference marks are given to components and members having the same and similar function in all the drawings only for illustration of the embodiments, and undue repetition of explanation thereof is omitted.

Example

Referring now to FIGS. 2 and 4, there will be described a communication path switching system according to an example of the present invention. A radio access network 71, 72 generally includes plural wireless base stations and radio network controllers. However, a single wireless base station and a single radio network controller only are illustrated in order to simplify the explanation. In addition, a core network 80 has generally plural layered exchange stations and further includes apparatuses such as a home memory storing subscriber information. However, since they are not directly related to the present invention, only a single exchange station 60 is illustrated and other apparatuses are omitted.

In FIG. 2, the transmission apparatuses 41, 42 are explained as independently separated transmission apparatuses, although the apparatuses 41, 42 may be configured as a single transmission apparatus. Although functions of the transmission apparatus and the wireless base station may be accommodated by a single apparatus, it is explained where the two functions are accommodated respectively by independent apparatuses.

The method, according to this example, of switching from the external communication to the internal communication during communications requires neither re-establishment of the wireless physical layer 311, 321 nor re-establishment of the wireless data link layer 313 in the mobile station as shown in FIG. 3. Switching from the external communication to the internal communication is realized by shifting a termination point of the wireless data link layer from the radio network controller 31 to the transmission apparatus 41 in the radio access network and shifting the transport bearer 351 formed between the wireless base station 21 and the radio network controller 31 to a transport bearer 352 formed between the wireless base station 21 and the transmission apparatus 41.

It should be noted here that the wireless data link layer 313 is not re-established in the mobile station 11. It is in the radio access network that the termination point of the wireless data link layer is shifted from the radio network controller 31 to the transmission apparatus 41. At this time, in order to allow operation of the wireless data link layer to be normally continuous, establishment information of the layer concerned is also passed down from the radio network controller to the transmission apparatus 41, and thus the operation based on the same establishment information is started in the transmission apparatus 41. In the W-CDMA system, when the wireless data link layer includes functions of confidentiality and integrity protection, for example, these functions come into effect under the same establishment information. The shifting operation can be realized by transmitting a message to request reception of necessary information from the radio network controller 31 to the transmission apparatus 41, as shown in a sequence described below.

Figure 6:
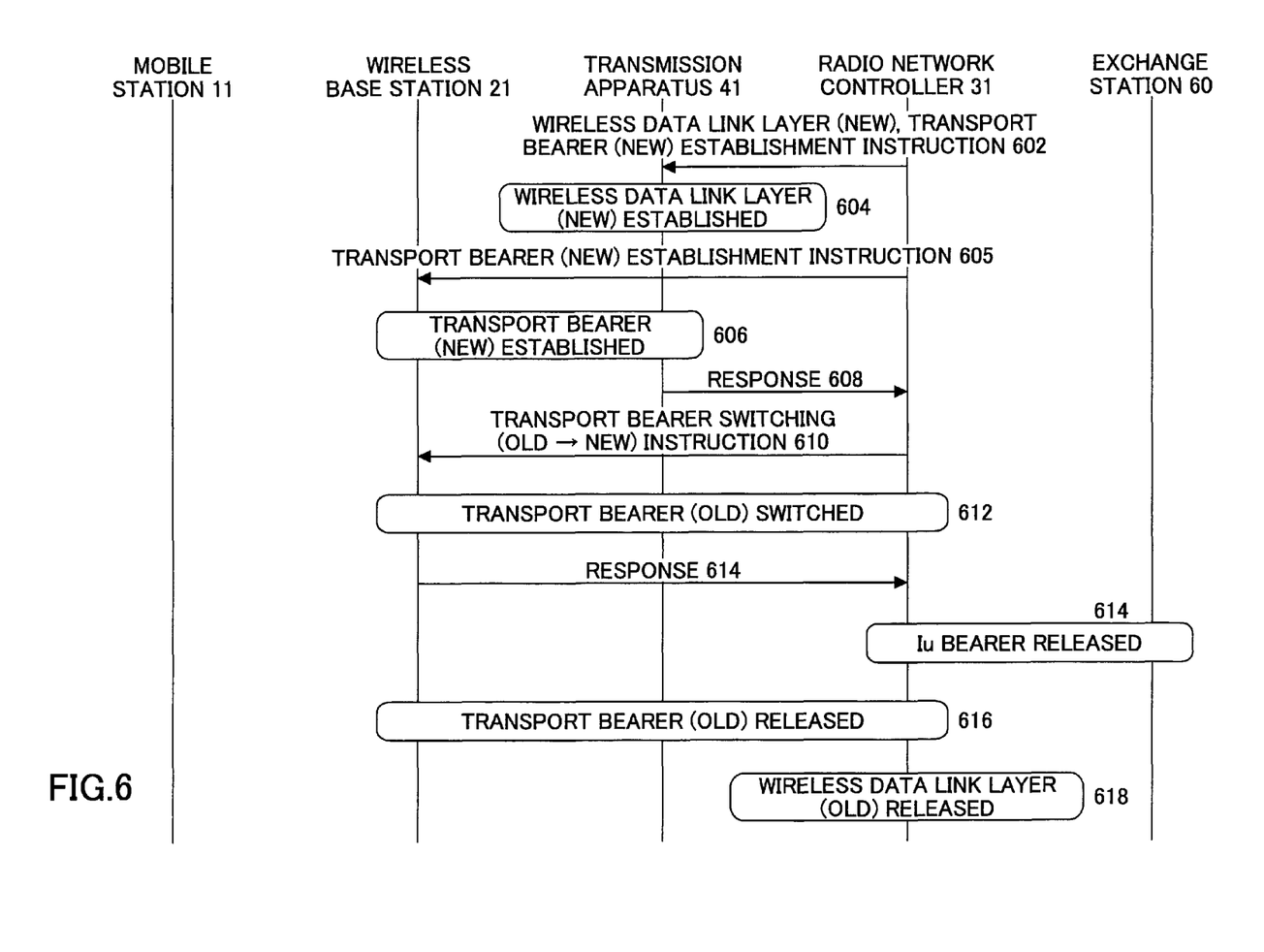
FIG. 6 is a sequence chart illustrating switching from an external communication to an internal communication, according to an example of the present invention.

FIG. 6 is a sequence chart illustrating switching from the external communication to the internal communication, according to an example of the present invention. When detecting a trigger for switching to the internal communication during the external communication, the radio network controller 31 instructs the transmission apparatus 41 to establish a new wireless data link layer 346 and a transport bearer 352 (602). At this time, the radio network controller 31 acquires establishment information of the wireless data link layer 336 that has been established in the radio network controller 31, and then notifies the transmission apparatus 41 of the acquired information. The establishment information is such as information for confidentiality and integrity protection. Here, the wireless data link layer 346 that is newly established by the transmission apparatus 41 takes over the operation previously assumed by the obsolete wireless data link layer 336 on the basis of the received establishment information, and thus the communication is continuously maintained without re-establishing the wireless data link layer 313 in the mobile station 11.

Next, the radio network controller 31 instructs the wireless base station 21 to establish a new transport bearer (605). At this time, the radio network controller 31 can give notice of the new and the old IP address and UDP port number in the case of a UDP/IP-based transport bearer, and thus instruct replacement of the old IP address and UDP port number with the new IP address and UDP port number. After receiving a response from the transmission apparatus 41 (608), the radio network controller 31 instructs the wireless base station 21 to shift (switch) the transport bearer 351 to the transport bearer 352. Upon being instructed, the wireless base station 21 shifts the old transport bearer 351 for the external communication to the new transport bearer 352 for the internal communication (612). This is performed, for example, by replacing the old IP address and UDP port number with the new IP address and UDP port number in the case of a UDP/IP-based transport bearer. After the shifting is complete, the wireless base station 21 reports the completion to the radio network controller 31 (614).

Subsequently, the radio network controller 31 releases the Iu bearer that has already been ineffective for the external communication between the radio network controller and the exchange station (614); releases the old transport bearer (616); and releases the old wireless data link layer (618), thereby completing the sequence. Here, in this sequence, the wireless physical layers 311, 321 and the wireless data link layer 313 in the mobile station are maintained continuously without being re-established. Although switching from the external communication to the internal communication has been described in the above example, the method according to the present invention is applicable to switching from the internal communication to the external communication and switching between the external communications.

Figure 7:
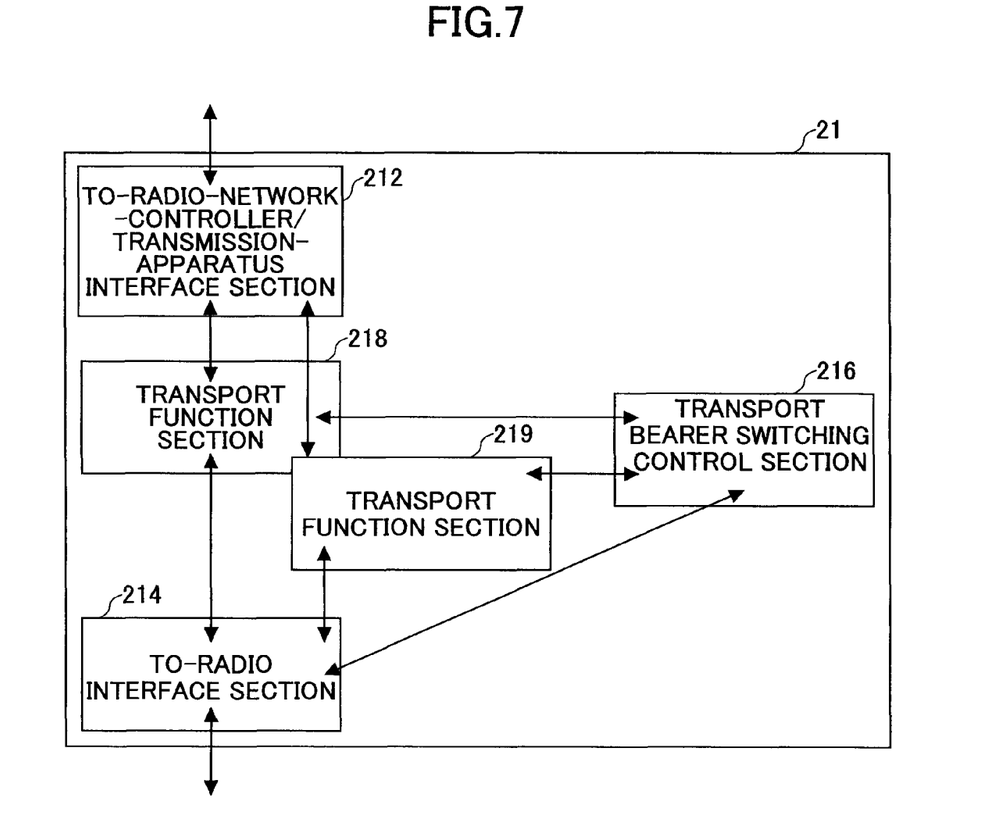
FIG. 7 is a configuration example of a wireless base station according to an example of the present invention.

FIG. 7 is a configuration example of a wireless base station according to an example of the present invention. The wireless base station 21 includes a "to radio network controller and transmission apparatus" interface section 212 having a function of interfacing with the radio network controller 31 and the transmission apparatus 41. The interface section 212 carries out wired communication with the transmission apparatus 41 and relays data transmitted from a mobile station toward the transmission apparatus over a wired communication path. The wireless base station 21 further includes two transport function sections 218, 219 having a protocol function such as Iub FP/UDP/IP. The transport function sections 218, 219 associate a wireless communication path with plural the wired communication paths. The wireless base station 21 further includes a "to radio" interface section 214 having an execution function of the wireless physical layer, and a transport bearer switching control section 216. The interface section 214 carries out wireless communication with the mobile station 11 and relays data from the mobile station over a wireless communication path. The transport bearer switching control section 216 makes a transition from a data relay state between the wireless communication path and one wired communication path to a data relay state between the wireless communication path and another wired communication path without re-establishing the wireless communication path.

The wireless base station 21 according to this example is characterized in one way in that two transport function sections 218, 219 can theoretically exist simultaneously and in that the wireless base station 21 includes the transport bearer switching control section 216 having a switching function that makes active either one of the transport function sections 218, 219. This means that two entities identified by transmission and reception addresses/port numbers in the case of UDP/IP-based transport bearer, for example, can exist simultaneously and switching of active entities can be controlled by the transport bearer switching control section 216. By employing such a configuration, a single wireless physical layer connection is associated with plural transport bearers and either one of the transport bearers can be activated without re-establishing the wireless physical layer connection.

Figure 8:
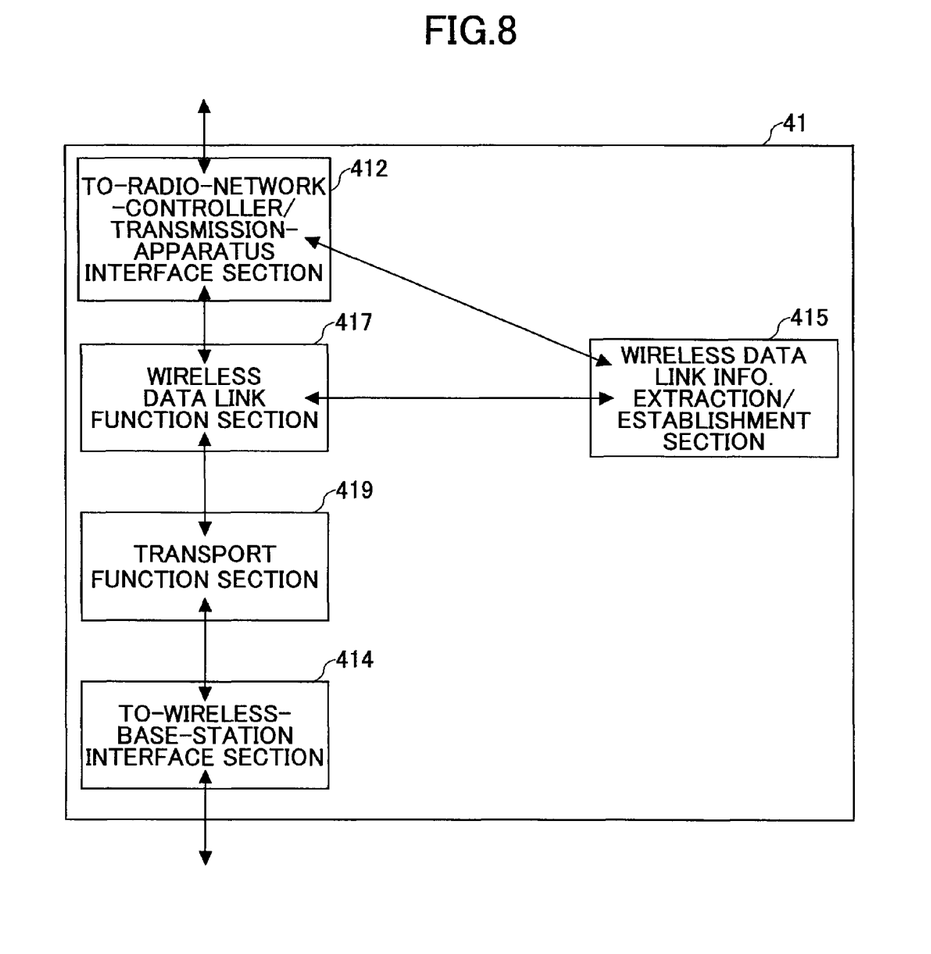
FIG. 8 is a configuration example of a transmission apparatus according to an example of the present invention.

FIG. 8 is a configuration example of a transmission apparatus according to an example of the present invention. The transmission apparatus 41 shown in FIG. 8 includes a "to radio network controller and transmission apparatus" interface section 412 having a function of interfacing with the radio network controller 31 and another transmission apparatus. The interface section 412 establishes a wired communication path to be used to relay data transmitted from a mobile station to another mobile station. The transmission apparatus 41 further includes a wireless data link function section 417 as wireless data transmission and reception control means, the section 417 having a data transmission and reception function that terminates the wireless data link layer thereby to transmit/receive data over a wireless communication path; a transport function section 419 having a transport protocol function such as Iub FP/UDP/IP; a "to wireless base station" interface section 414 having a function of interfacing with a wireless base station; and a wireless data link information extraction and establishment section 415.

The transmission apparatus 41 according to this example is characterized in one way in that there is provided the wireless data link information extraction and establishment section 415 as notification means and commencement means, which enables extracting wireless data link information and thus to notify a transmission apparatus that is to take over therefrom of the extracted information. Additionally, the received wireless data link information is then established and operations based thereon become possible. Namely, wireless data transmission and reception control can be started on the basis of the wireless data transmission and reception control information sent from another transmission apparatus without resetting the wireless data transmission and reception control.

Figure 9:
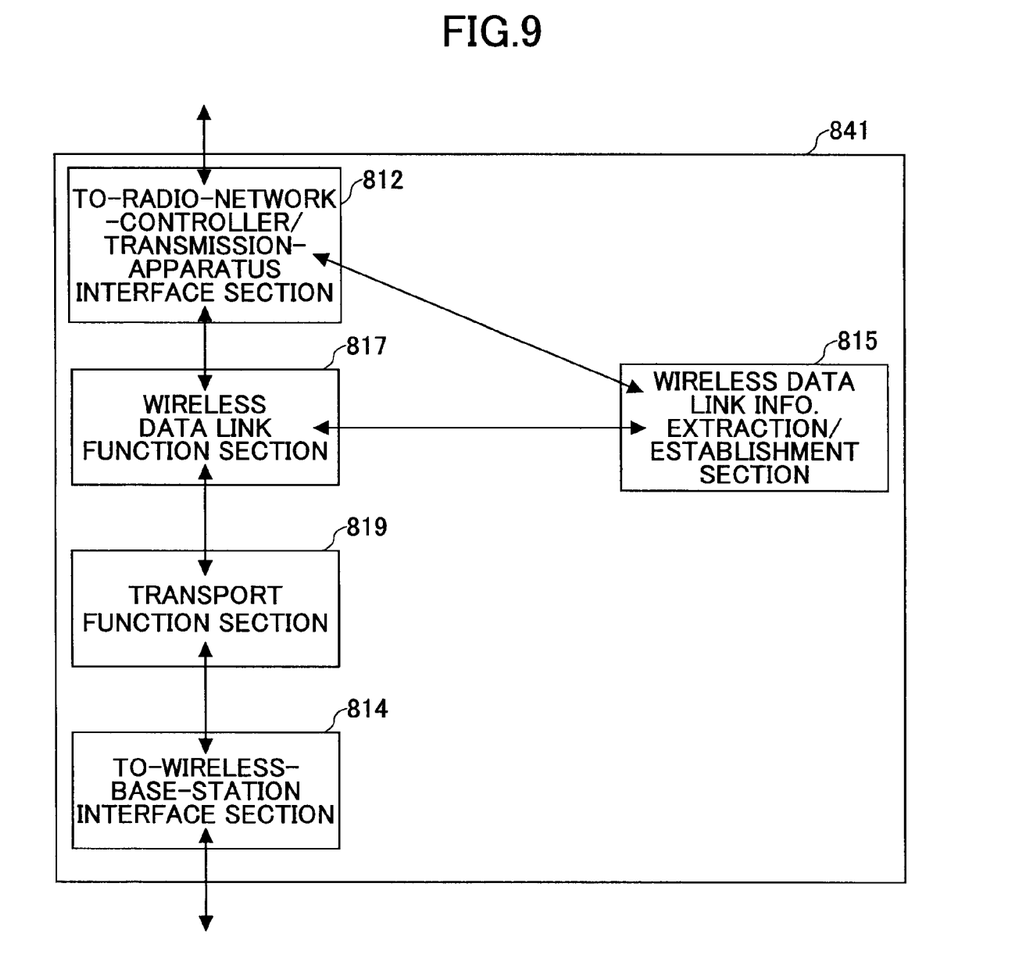
FIG. 9 is a configuration example of a transmission apparatus in a radio network controller according to the present invention.

The radio network controller 31 can include thereinside a wireless control section having a wireless control function and a transmission section having a transmission function. FIG. 9 illustrates a configuration example where the transmission section has a function allowing for switching of communication paths according to this example.

The transmission section 841 includes a "to radio network controller and transmission apparatus" interface section 812 having a function of interfacing with another radio network controller and transmission apparatus. The interface section 812 establishes a wired communication path to be used to relay data transmitted from a mobile station to another mobile station. The transmission section 841 further includes a wireless data link control section 817 as wireless data transmission and reception control means, the section 817 having a data transmission and reception function that terminates the wireless data link layer thereby to transmit/receive data over a wireless communication path; a transport function section 819 having a transport protocol function such as Iub FP/UDP/IP; a "to wireless base station" interface section 814 having a function of interfacing with a wireless base station; and a wireless data link information extraction and establishment section 815.

The transmission section 841 according to this example is characterized in one way in that there is provided the wireless data link information extraction and establishment section 815, which enables extracting the wireless data link information and thus to notify a transmission apparatus that is to take over therefrom of the extracted information. Additionally, the received wireless data link information is then established and operations based thereon become possible. Namely, wireless data transmission and reception control can be started on the basis of the wireless data transmission and reception control information sent from another transmission apparatus without resetting the wireless data transmission and reception control.

As described above, the transmission section 841 in the radio network controller 31 and the transmission apparatus 41 have the same configuration. In the specification and claims of the present application, a term "transmission apparatus" is to include a transmission apparatus, a transmission section in the radio network controller, and another apparatus having a transmission function.

The communication path switching system and method according to the present invention is employed in order to shorten processing delays associated with switching of communication paths and reduce the processing workload on a mobile station in a mobile communication system.

This international application claims the benefit of the priority date of Japanese Patent Application No. 2004-290311 filed on Oct. 1, 2004, and the entire content of which application is incorporated herein by reference.

The invention claimed is:

1. A communication path switching system in a mobile wireless communication system, the communication path switching system comprising:
   a first wireless base station and a first radio network controller that have a function of wireless communication with a first mobile station and a function of relaying data from the first mobile station over a first wireless communication path;
   a second wireless base station and a second radio network controller that have a function of wireless communication with a second mobile station and a function of relaying data to the second mobile station over a second wireless communication path; and
   a transmission apparatus having a function of wired communication with the first and second wireless base stations and capable of establishing a wired communication path to be used to relay the data transmitted from the first mobile station toward the second mobile station, wherein
   the mobile wireless communication system includes a first transfer path and a second transfer path as data transfer routes from the first mobile station to the second mobile station, the first transfer path connects the first wireless base station and the second wireless base station through the first radio network controller, an exchange station and the second network controller, and the second transfer path connects the first wireless base station and the second wireless base station through the transmission apparatus without passing through the first radio network controller, the exchange station and the second radio network controller,
   the first radio network controller includes a notifying unit configured to extract wireless data transmission and reception control information on the first wireless communication path with the first mobile station and to notify the transmission apparatus of the control information, and
   the first transfer path is switched to the second transfer path without re-establishing the first and second wireless communication paths between the first and second mobile stations and the first and second wireless base stations.

2. A method of switching communication paths of a communication path switching system in a mobile wireless communication system, the communication path switching system including: a first wireless base station and a first radio network controller that have a function of wireless communication with a first mobile station and a function of relaying data from the first mobile station over a first wireless communication path; a second wireless base station and a second radio network controller that have a function of wireless communication with a second mobile station and a function of relaying data to the second mobile station over a second wireless communication path; and a transmission apparatus having a function of wired communication with the first and second wireless base stations and capable of establishing a wired communication path to be used to relay the data transmitted from the first mobile station toward the second mobile station; the method comprising:
   extracting wireless data transmission and reception control information on the first wireless communication path with the first mobile station;
   notifying the transmission apparatus of the control information; and
   switching a first transfer path to a second transfer path without re-establishing the first and second wireless communication paths between the first and second mobile stations and the first and second wireless base stations, wherein the mobile wireless communication system includes the first transfer path and the second transfer path as data transfer routes from the first mobile station to the second mobile station, the first transfer path connecting the first wireless base station and the second wireless base station through the first radio network controller, an exchange station and the second network controller, and the second transfer path connecting the first wireless base station and the second wireless base station through the transmission apparatus without passing through the first radio network controller, the exchange station and the second radio network controller.

3. A transmission apparatus in a mobile communication system that includes a first wireless base station, a second wireless base station, and a radio network controller and that allows for a switching of communication path, the transmission apparatus comprising:

a first communication unit configured to perform wired communication with a wireless base station and establish a wired communication path to be used to relay data transmitted from a mobile station toward another mobile station;

a second communication unit configured to perform a wireless data transmission and reception control over a wireless communication path with the mobile station; and a control unit configured to start the wireless data transmission and reception control based on establishment information that is received from the radio network controller and that instructs establishment of the wireless data transmission and reception control, wherein the transmission apparatus switches a first transfer path to a second transfer path connecting the first wireless base station and the second wireless base station without passing through the radio network controller and an exchange station without re-establishing wireless communication paths between mobile stations and wireless base stations.

* * * * *